(12) United States Patent
Cheng et al.

(10) Patent No.: US 11,063,902 B2
(45) Date of Patent: *Jul. 13, 2021

(54) METHOD FOR IDENTIFYING MULTIPLE DEVICES BELONGING TO THE SAME GROUP

(71) Applicant: Oath Inc., New York, NY (US)

(72) Inventors: Hao Cheng, Santa Clara, CA (US); Rohit Chandra, Sunnyvale, CA (US); Jimmy Yang, Palo Alto, CA (US)

(73) Assignee: Verizon Media Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,140

(22) Filed: Dec. 16, 2019

(65) Prior Publication Data
US 2020/0120066 A1 Apr. 16, 2020

Related U.S. Application Data

(63) Continuation of application No. 15/856,801, filed on Dec. 28, 2017, now Pat. No. 10,511,568, which is a
(Continued)

(51) Int. Cl.
H04L 29/12 (2006.01)
G06Q 30/02 (2012.01)
(Continued)

(52) U.S. Cl.
CPC ......... *H04L 61/2503* (2013.01); *G06Q 30/02* (2013.01); *H04L 63/1408* (2013.01);
(Continued)

(58) Field of Classification Search
CPC . H04L 61/2503; H04L 61/1408; H04L 67/22; H04W 4/025; G06Q 20/3825; G06Q 30/0201; G06Q 30/00; G06Q 30/02
(Continued)

(56) References Cited

U.S. PATENT DOCUMENTS 7,761,558 B1 * 7/2010 Jindal ................... H04L 67/303
709/224
8,966,036 B1 * 2/2015 Asgekar ................ G06Q 10/10
709/223
(Continued)

*Primary Examiner* — Ruolei Zong
(74) *Attorney, Agent, or Firm* — Cooper Legal Group, LLC

(57) ABSTRACT

The technologies described herein identify multiple electronic devices belonging to the same group. A computer system receives, from network accessing applications of a plurality of electronic devices, internet protocol (IP) trajectory information about the network accessing applications via a network. The IP trajectory information includes a user identifier, a list of IP addresses associated with each of the network accessing applications, and timestamps specifying times each of the network accessing applications accesses the network. The computer system identifies and removes commercial IP addresses from the list of IP addresses, analyzes IP trajectory information to retrieve a most commonly used IP address for each of the network accessing applications during a certain period, and determines that different network accessing applications belong to the same group if the most commonly used IP addresses for the different network accessing applications are the same.

20 Claims, 10 Drawing Sheets

Related U.S. Application Data continuation of application No. 14/700,616, filed on Apr. 30, 2015, now Pat. No. 9,864,999.

(51) Int. Cl.
*H04L 29/06* (2006.01)
*H04L 29/08* (2006.01)
*H04W 4/02* (2018.01)

(52) U.S. Cl.
CPC ...... H04L 67/22 (2013.01); *G06F 2221/2111* (2013.01); *G06Q 30/0255* (2013.01); *H04W 4/025* (2013.01)

(58) Field of Classification Search
USPC .......................................................... 709/245
See application file for complete search history.

(56) References Cited

U.S. PATENT DOCUMENTS

| | | | |
|---|---|---|---|
| 9,197,595 B1* | 11/2015 | Sandler | H04L 67/18 |
| 9,515,984 B1* | 12/2016 | Griggs | H04L 61/6068 |
| 2002/0103850 A1* | 8/2002 | Moyer | H04L 61/2564 |
| | | | 709/202 |
| 2010/0151816 A1* | 6/2010 | Besehanic | H04W 4/025 |
| | | | 455/405 |
| 2015/0106198 A1* | 4/2015 | Miller | G06Q 30/0251 |
| | | | 705/14.52 |
| 2015/0341453 A1* | 11/2015 | Miller | H04W 4/21 |
| | | | 709/204 |
| 2016/0092923 A1* | 3/2016 | Grenier | G06F 16/9537 |
| | | | 705/14.36 |
| 2016/0239868 A1* | 8/2016 | Demsey | H04L 67/1097 |

\* cited by examiner

METHOD FOR IDENTIFYING MULTIPLE DEVICES BELONGING TO THE SAME GROUP

CROSS REFERENCE TO RELATED APPLICATIONS

This application is a continuation of U.S. patent application Ser. No. 15/856,801 filed Dec. 28, 2017, to be issued as U.S. Pat. No. 10,511,568 on Dec. 17, 2019, which is a continuation of U.S. patent application Ser. No. 14/700,616 filed Apr. 30, 2015, which was issued as U.S. Pat. No. 9,864,999 on Jan. 9, 2018. The contents of U.S. patent application Ser. No. 15/856,801 and U.S. patent application Ser. No. 14/700,616 are incorporated herein in their entirety by this reference.

BACKGROUND

This application relates generally to a method for identifying devices belonging to the same group. More particularly, this application relates to identifying network accessing applications of electronic devices that belong to the same group or household by analyzing IP trajectories of the network accessing applications.

People today are using more and more personal electronic devices such as desktop computers, laptop computers, smartphones, tablet computers and wearable devices to connect with the Internet. These electronic devices have now become necessities, and people usually own and use more than one electronic device in everyday life. For example, a person may use a desktop computer at home, and bring her laptop or tablet computer to the workplace while almost always carrying her smartphone or a wearable device such as a smart watch. Thus, people are not limited to a single electronic device when accessing the Internet, but move from one device to other devices. For example, when a person shops online, she may search products using her smartphone and then move over to her laptop to finally purchase a product that she found previously using the smartphone.

Thanks to ubiquitous wireless accessibility and the light weight of electronic devices, people carry one or more electronic devices more frequently than before and are able to connect with the Internet anywhere they go. For example, a person at home may shop online using her tablet computer, and then bring it to a coffee shop and keep using it while connected to the coffee shop's Wi-Fi network. Also, she may bring the tablet computer when she travels to a different city, and connect the tablet computer to a hotel's Wi-Fi network in that city.

In order to access the Internet, a device usually communicates with a router located nearby. A single internet protocol (IP) address is assigned to the router. So, when a user visits a certain website using a web browser of the device, an IP address assigned to the router may be provided to a server for the website along with a browser cookie specific to the web browser of the device. If a user visits the same website using one device at two or more different physical locations, various IP addresses which are assigned to routers located in those locations are delivered to the server with a single browser cookie associated with the device.

If a user owns more than one device, and uses different devices at different locations, IP address information collected from the devices would be different from each other. For example, if a person visits a website using her laptop computer mostly at home and her tablet computer at a coffee shop, a server for the website will receive different IP address information for the two devices even if those two devices belong to the same person. Thus, the server is not able to recognize that the IP address information originates from a single person.

If a user logs in or signs in to a website whenever she uses each of the electronic devices, a server for the website would be able to recognize, through the login information, that a single user accesses the website regardless of various IP addresses it receives. However, if a user does not log in or sign in to a website when she shops online or otherwise accesses a website, the server for the website would not be able to recognize that a single user accesses the website because of the lack of login information. Rather, the server may conclude that different users accessed the website based on the different IP addresses.

In reality, many people do not log in when conducting online shopping or web searching, and thus, it is difficult for a server to figure out whether any two IP addresses originate from the same person, household or group. One of the technical problems solved by the disclosure is to accurately identify two or more connecting activities that are from devices of a single person, family members in the same household or a certain group so that a server may provide the same content such as advertisements, news, music, etc. to the same person, family members, or group members through multiple electronic devices.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; emphasis instead is being placed upon illustrating the principles of the system. In the drawings, like referenced numerals designate corresponding parts throughout the different views.

DETAILED DESCRIPTION

Figure 1:
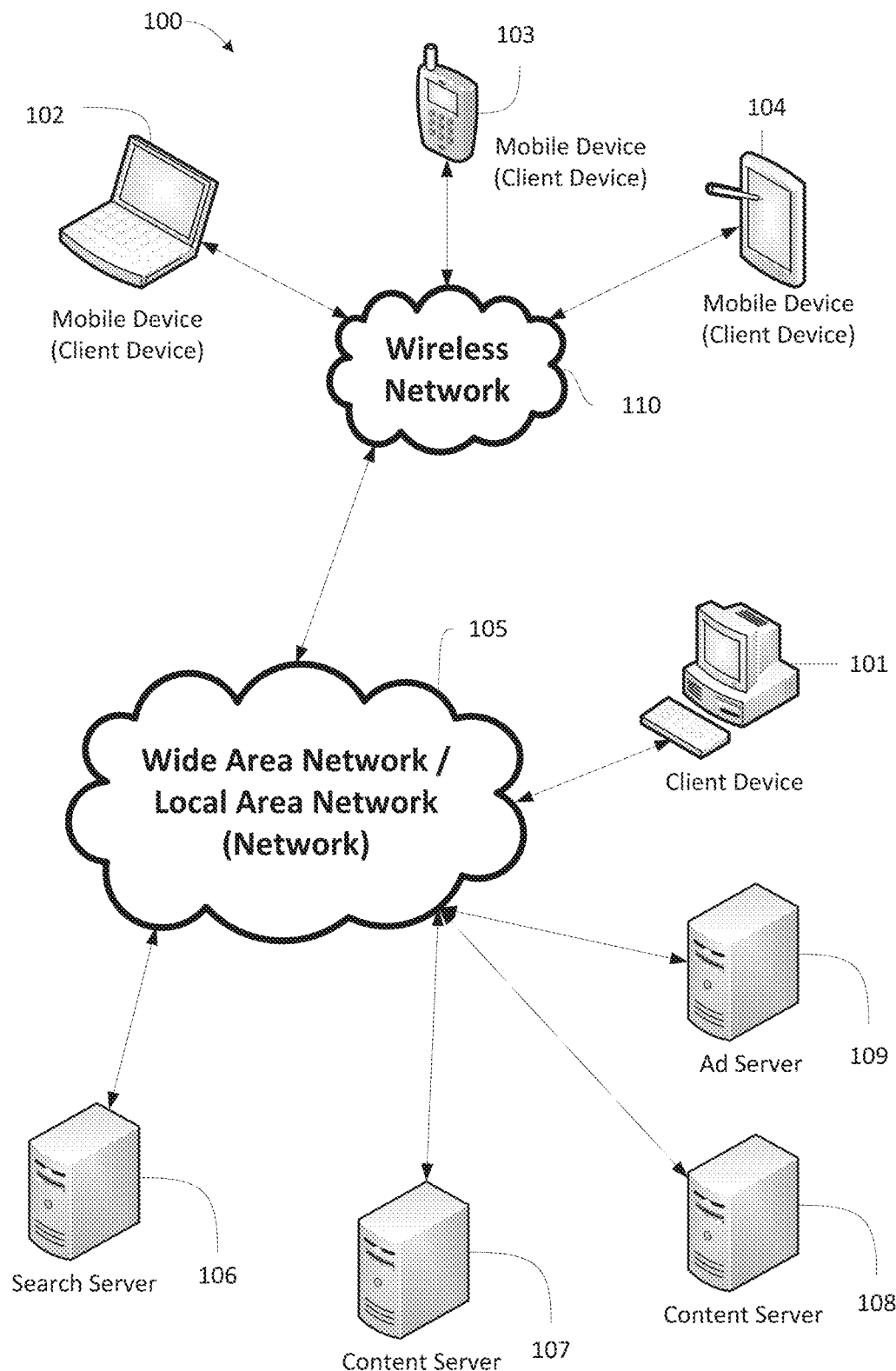
FIG. 1 illustrates a block diagram of an example information system that includes example devices of a network that can communicatively couple with content server.

Subject matter will now be described more fully hereinafter with reference to the accompanying drawings, which form a part hereof, and which show, by way of illustration, specific examples. Subject matter may, however, be embodied in a variety of different forms and, therefore, covered or claimed subject matter is intended to be construed as not being limited to examples set forth herein; examples are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Overview

Different from conventional solutions, the disclosed system solves the above problem by using evolutionary explorations.

The technologies described herein identify multiple electronic devices belonging to the same group. In a first aspect, a computer system receives, from network accessing applications of a plurality of electronic devices, internet protocol (IP) trajectory information about the network accessing applications via a network. The IP trajectory information includes a user identifier, a list of IP addresses associated with each of the network accessing applications, and timestamps specifying times each of the network accessing applications accesses the network. The computer system identifies and removes commercial IP addresses from the list of IP addresses, analyzes IP trajectory information to retrieve a most commonly used IP address for each of the network accessing applications during a certain period, and determines that different network accessing applications belong to the same group if the most commonly used IP addresses for the different network accessing applications are the same.

In a second aspect, a computer system receives, from network accessing applications of a plurality of electronic devices, internet protocol (IP) trajectory information about the network accessing applications via a network. The IP trajectory information includes a user identifier, a list of IP addresses associated with each of the network accessing applications, and timestamps specifying times each of the network accessing applications accesses the network. The computer system identifies and removes commercial IP addresses from the list of IP addresses to produce revised IP addresses. Then, the computer system analyzes patterns of changes of the revised IP addresses for two different network accessing applications with reference to the timestamps associated with the revised IP addresses. If the patterns of the revised IP addresses for two different network accessing applications are aligned to each other, the two different network accessing applications are determined to belong to the same group.

In a third aspect, based on the identification of network accessing applications that belong to the same person, household or group, the computer system provides same advertisements to the network accessing applications belonging to the same group via the network.

The methods are useful for identifying multiple electronic devices belonging to a group of devices that have a common connection or relationship. In a particular example, the group includes members of the same household. The household may be members of a family that live together in the same residence and access the Internet through a common connection. Alternatively, the group may include any selected group, such as co-workers, students, colleagues, or any group that has a defined connection such as a common network access point. Identifying the multiple devices belonging to the group allows a server or other device to more reliably and efficiently serve data to all devices of the group, with fewer duplications and with greater focus and relevance of the data provided for the needs of the user or users of the multiple devices.

DETAILED DESCRIPTION

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so-called 'virtual persons.' An individual's social network may be represented in a variety of forms, such as visually, electronically or functionally. For example, a "social graph" or "socio-gram" may represent an entity in a social network as a node and a relationship as an edge or a link.

While the publisher and social networks collect more and more user data through different types of e-commerce applications, news applications, games, social networks applications, and other mobile applications on different mobile devices, a user may by tagged with different features accordingly. Using these different tagged features, online advertising providers may create more and more audience segments to meet the different targeting goals of different advertisers. Thus, it is desirable for advertisers to directly select the audience segments with the best performances using keywords. Further, it would be desirable to the online advertising providers to provide more efficient services to the advertisers so that the advertisers can select the audience segments without reading through the different features or descriptions of the audience segments. The present disclosure provides a computer system that expands targeted users by identifying multiple electronic devices belonging to the same group who share common interests.

FIG. 1 is a schematic diagram illustrating an example embodiment of a network 100. Other embodiments that may vary, for example, in terms of arrangement or in terms of type of components, are also intended to be included within claimed subject matter. As shown, FIG. 1, for example, includes a variety of networks, such as local area local area network (LAN)/wide area network (WAN) 105 and wireless network 110, a variety of devices, such as client device 101 and mobile devices 102, 103, 104, and a variety of servers, such as search server 106, content server 107 and 108, and ad server 109.

A client device such as the mobile devices 102, 103, 104 may include a computing device capable of sending or receiving signals, such as via a wired or a wireless network. As is suggested by the client devices 102, 103, 104 illustrated in FIG. 1, a client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color two dimensional or three dimensional display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers such as the search server 106, content servers 107, 108, and ad server 109 may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

A content server 107 may include a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server 107 may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

A network such as network 100 may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network such as wireless network 110 may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or second, third, or fourth generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Ad server 109 includes a server that stores online advertisements for presentation to users. "Ad serving" refers to methods used to place online advertisements on websites, in applications, or other places where users are more likely to see them, such as during an online session or during computing platform use, for example.

Various monetization techniques or models may be used in connection with sponsored search advertising, including advertising associated with user search queries, or non-sponsored search advertising, including graphical or display advertising. In an auction-type online advertising marketplace, advertisers may bid in connection with placement of advertisements, although other factors may also be included in determining advertisement selection or ranking. Bids may be associated with amounts advertisers pay for certain specified occurrences, such as for placed or clicked-on advertisements, for example. Advertiser payment for online advertising may be divided between parties including one or more publishers or publisher networks, one or more marketplace facilitators or providers, or potentially among other parties.

Some models may include guaranteed delivery advertising, in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example.

A process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers.

For web portals like Yahoo, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

Figure 2:
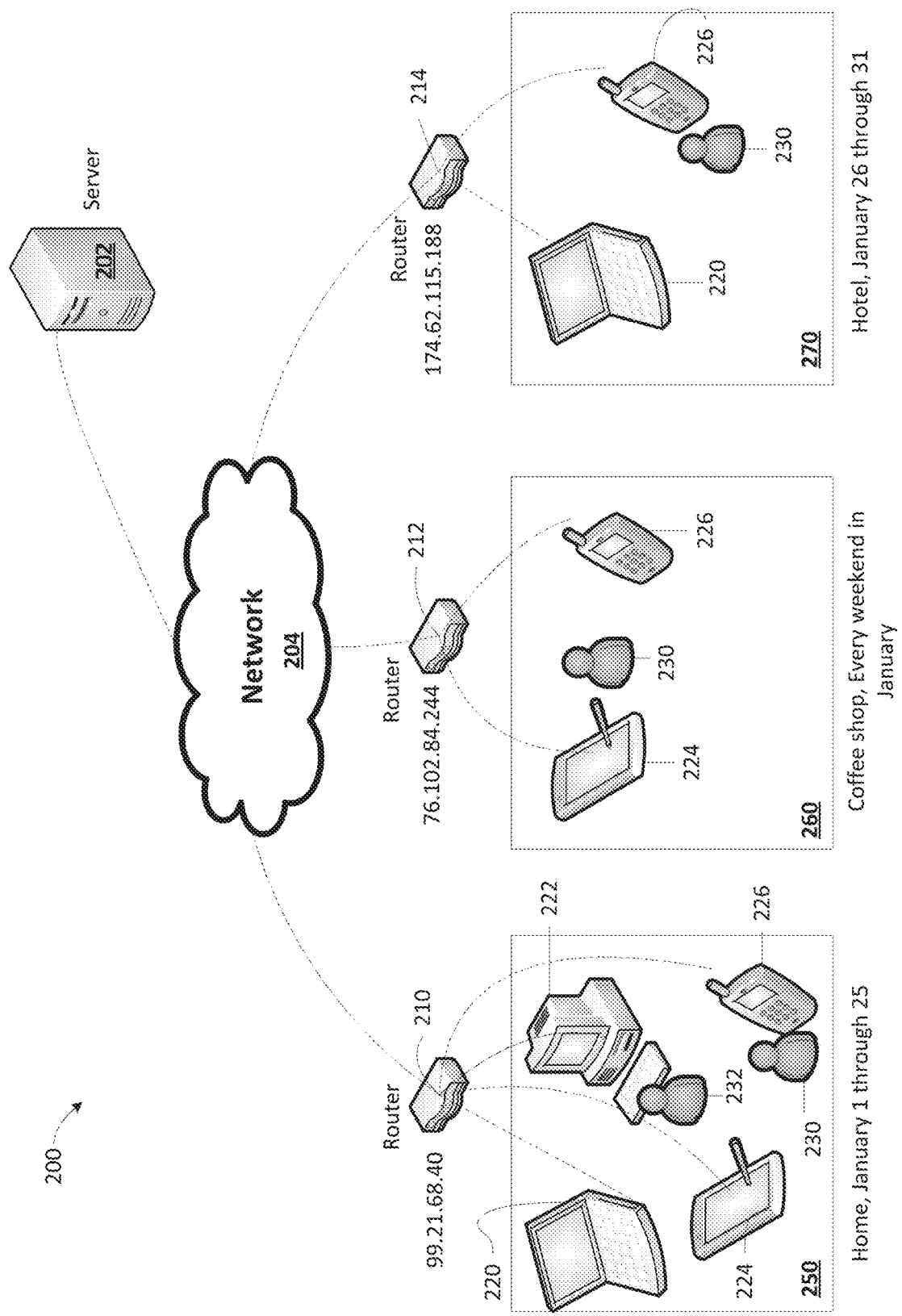
FIG. 2 illustrates multiple electronic devices used at different locations by one or more users for one month.

FIG. 2 illustrates a network system 200 including multiple electronic devices used at different locations by one or more users for one month. The three boxes 250, 260 and 270 represent different locations: at home, box 250, at a coffee shop, box 260, and at a hotel, box 270. For example, one or more users move from one location to other location during one month period. Although FIG. 2 illustrates only three locations, users may move to any other locations such as workplace, airport, etc. which provide wireless network access through routers.

In one embodiment, three routers 210, 212, and 214 are communicating with the network 204 to access a website operated by the server 202. Although FIG. 2 illustrates one server 202, there may be a plurality of servers that operate their websites. In addition, an ad server may be present to deliver advertisements to multiple electronic devices. The routers 210, 212, and 214 are located at different locations as illustrated in FIG. 2. For example, the router 210 is located at home, box 250, through which electronic devices at home may be able to connect with the network 204. The router 212 is located at a coffee shop, box 260, and people visiting the coffee shop may access the network 204 through the router 212. The router 214 is located at a hotel, box 270, so that travelers may use the Internet through the router 214 while staying at the hotel. Although not shown in the drawings, users may connect with the network 204 through, for example, 2G, 3G, or 4G cellular technology provided by telecommunication companies such as Verizon and AT&T when access through one of the routers is not available. For example, when a user is out of home and on the way to a coffee shop, her smartphone may connect with the network 204 through 4G cellular service provided by AT&T.

Each of the routers 210, 212 and 214 is assigned a different IP address. For example, as shown in FIG. 2, the router 210 is assigned the IP address of 99.21.68.40, the router 212 is assigned the IP address of 76.102.84.244 and the router 214 is assigned the IP address of 174.62.115.188. The IP addresses may be static IP addresses which do not change over time. The IP addresses may be a residential IP address or a commercial IP address. Residential IP addresses are IP addresses assigned to households. Commercial IP addresses include company network IP addresses, public hotspot IP addresses such as IP addresses used at Starbucks or an airport gateway, or cellular gateway IP addresses such as AT&T cellular tower IP addresses.

For the router 210, various electronic devices at home may communicate with the router 210 to connect with the network 204. In one embodiment, a laptop computer 220, a desktop computer 222, a tablet computer 224, and a cell phone 226 may connect to the same router 210. The connection may be wired or wireless connection. For example, the desktop computer 222 is connected with the router with a cable, whereas the laptop computer 220, the tablet computer 224, and the smartphone 226 are wirelessly connected to the router 210.

One or more people may reside in the same household and use their personal electronic devices at home. For example, as shown in FIG. 2, two users, including user 230 and user 232, may reside at home, box 250. More users may stay at home 250 depending on the size of the family or frequently visiting relatives or guests. Although FIG. 2 illustrates only one smartphone 226, there may be more than one smartphone so that each user at home 250 uses their own smartphone simultaneously or at different times. Similarly, there may be a plurality of electronic devices of a type, for example, two laptops, and three tablet computers. Users in the same household may share and use their electronic devices. For example, both users 230 and 232 share the tablet computer 224. So, if the user 230 is on business travel without carrying the tablet computer 224, the other user 232 may use the tablet computer 224 at home.

When more than one user visits a website through the same router, the same IP address of the router is delivered to a server for the website. For example, in FIG. 2, one user 230 accesses a website using a mobile application of her smartphone 226 through the router 210, and the other user 232 opens a web browser from his desktop 222 to visit the same website through the router 210. For both connections, the same IP address of 99.21.68.40 is delivered to a server for the website that she or he may visit.

Similarly, more than one IP address is delivered to a server for a website when the user visits the website through different routers at multiple locations. For example, the user 230 brings her smartphone 226 and tablet computer 224 to the coffee shop 260 every weekend and accesses the network 204 through the router 212. At this time, the IP address of 76.102.84.244 associated with the router 212 is delivered via the network 204 to the server 202. The user 230 also brings her laptop 220 and smartphone 226 to the hotel 270 during her business travel. When the user 230 visits a website using her devices at the hotel 270, the IP address of 174.62.115.188 associated with the router 214 is delivered via the network to the server 202 for the website. While the user 230 is connected at the coffee shop 260 or the hotel 270, the user 232 may still be connected to the network 204 using his desktop at home 250 through the router 210.

Figure 3:
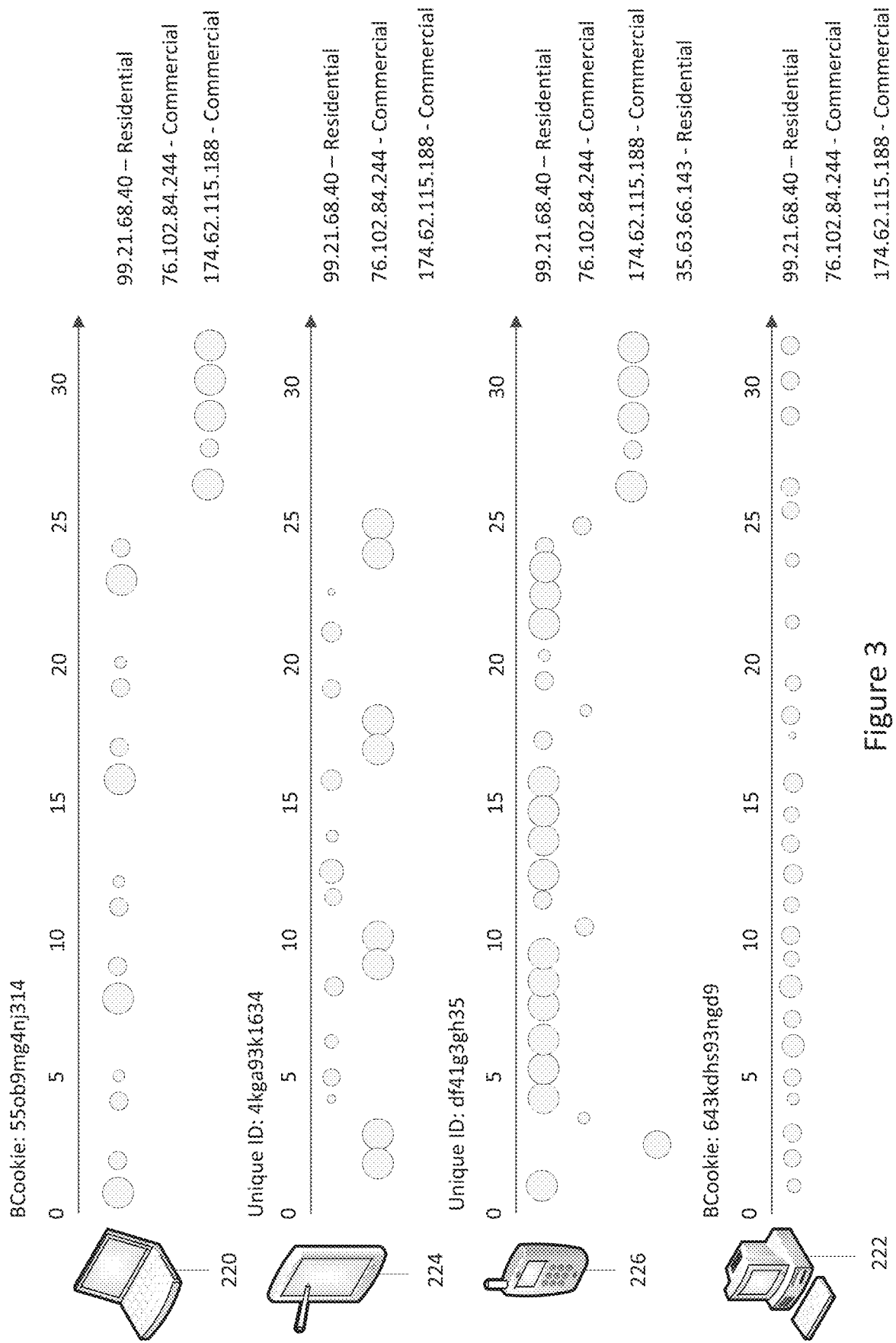
FIG. 3 illustrates an example of IP trajectories for multiple electronic devices accessing a network for one month.

FIG. 3 illustrates an example of IP trajectories for multiple electronic devices accessing the network for one month. When a user visits a website using her device via the network 204, the server for the webpage receives data and other information about some user events, such as page requests, ad requests, or any other interactions. User events accumulated over time form the IP trajectory information including a user identifier, a list of IP addresses, and timestamps. Additional or alternative IP trajectory information may be included in other embodiments. The user identifier may be a browser cookie ("BCookie") for a browser that a user is opening or a unique user identifier for a mobile device such as a smartphone or tablet computer. For example, a unique user identifier may be Identifier for Advertising (IDFA) for Apple or Google Play Services Advertising Identifier (GPSAID) on Android. Exemplary IP trajectories of the devices 220, 222, 224, and 226 for a month of January are illustrated on graphs in FIG. 3. As described with reference to FIG. 2, user 230 and user 232 in the same household may use or share the devices 220, 222, 224, and 226.

Each of the IP trajectories includes a user identifier, a list of IP addresses, and timestamps. For example, the IP trajectory of the laptop computer 220 includes a browser cookie ("BCookie") of "55ob9mg4nj314" as a user identifier, and a list of IP addresses (99.21.68.40, 174.62.115.188). The IP addresses are the addresses of the routers with which the laptop computer 220 is wirelessly connected as described above in reference to FIG. 2. Circles on the graph represent relative connection activity count of the day. Specifically, large circles represent that a certain BCookie is reported for a corresponding IP address many times on a certain day. For example, on January 1, BCookie of 55ob9mg4nj314 is reported for the IP address of 99.21.68.40 several times, so a large circle is drawn on the graph to reflect the large connection activities. Small circles represent that a certain BCookie is reported for a corresponding IP address only a few times on a certain day. For example, on January 5, BCookie of 55on9mg4nj314 showed up on the IP address of 99.21.68.40 one time, so a small circle is drawn on the graph to reflect the small connection activities. The number of connection activities may be obtained from timestamp data included in IP trajectory information.

A single BCookie may be reported for multiple IP addresses if a user moves to different locations and uses different routers at those locations. For example, when the user 230 brings her tablet computer 224 to the coffee shop 260 and connects it to the Internet, the unique user identifier of 4kga93k1634 associated with the tablet computer 224 is reported for the IP address of 76.102.84.244 associated with the router 212 at the coffee shop 260 on every weekend in January in addition to the IP address of 99.21.68.40 associated with the router 210 at home 250.

A device that a user always carries may have the largest connection activities among multiple electronic devices owned by the user. For example, the IP trajectory of the smartphone 226 includes a unique user identifier of "df41g3gh35" as a user identifier, and a list of IP addresses (99.21.68.40, 76.102.84.244, 174.62.115.188, 35.63.66.143). Compared to other IP trajectories, the IP trajectory of the smartphone 226 additionally includes an IP address of 35.63.66.143. Specifically, when the user 230 visits a friend's house, she carries only her smartphone which may be connected with the network through a router at the friend's house, the IP address of which is 35.63.66.143.

As illustrated in FIG. 3, from the perspective of the server 202 that receives IP trajectory information, it is difficult to find out any two IP trajectories that are from two devices of a single user or family members in the same household because the server receives only IP trajectories without any information on who is accessing the network, and cannot find similarity between two seemingly random IP trajectories. For example, the server would find that IP trajectories for the laptop computer 220 and the tablet computer 224 are significantly different, and conclude that the two IP trajectories are from two devices of two random people.

One of the technical problems solved by the disclosure is to accurately identify two or more connecting activities that are from devices of a single person, family members in the same household or a certain group so that a server may provide the same content such as advertisements, news, music, etc. to the same person, family members, or group members through multiple electronic devices. Specifically, the present invention identifies and groups user identifiers that are associated with the same group, such as family members, classmates, workers, people in the same social network, etc.

Figure 4:
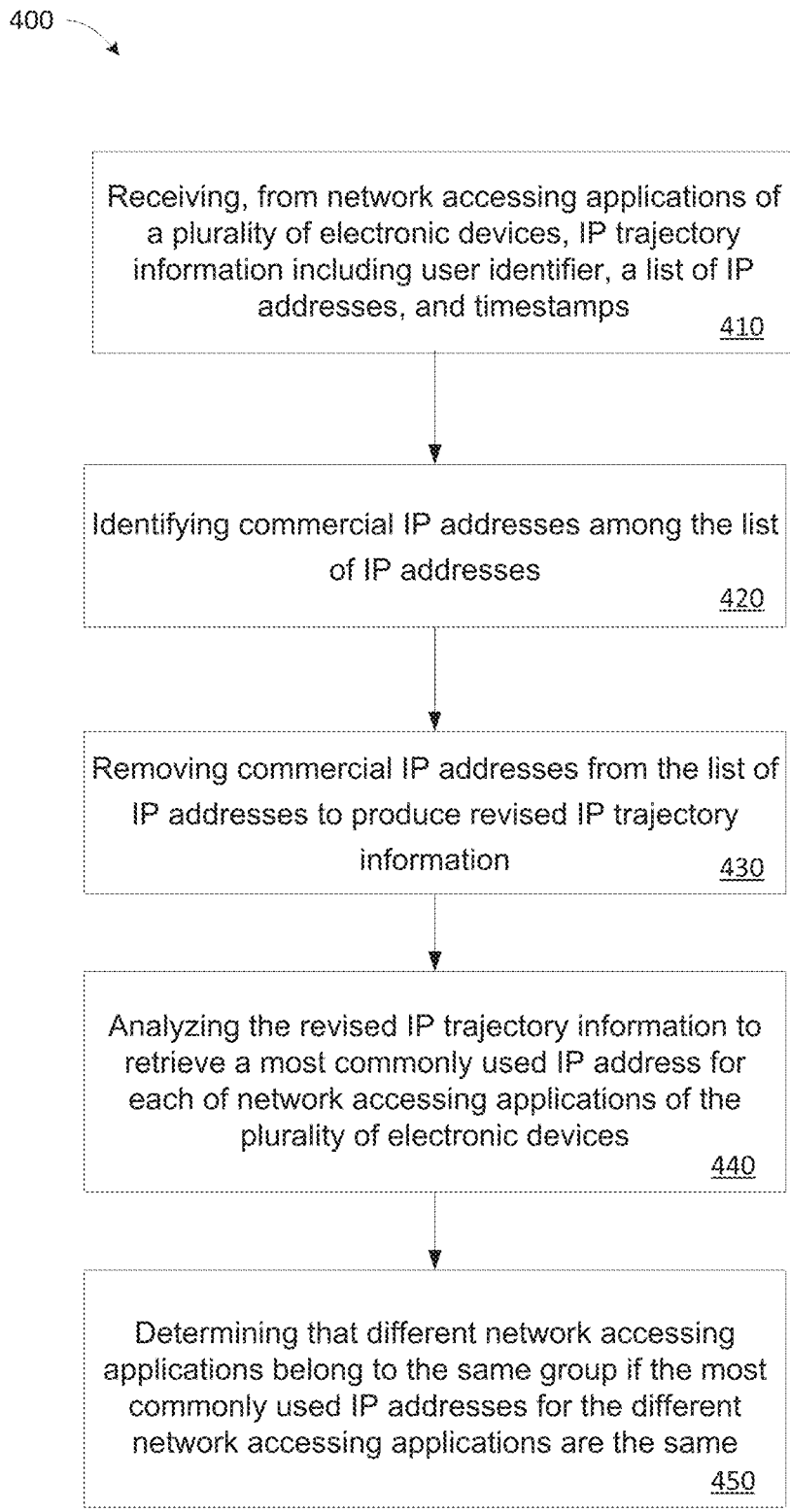
FIG. 4 is an example flow diagram illustrating embodiments of the disclosure.

FIG. 4 is an example flow diagram 400 illustrating embodiments of the disclosure. The flow diagram 400 may include IP trajectory analysis implemented at least partially by a computer system that includes a server having a processor or computer. The computer implemented method according to the example flow diagram 400 includes the following acts. Other acts may be added or substituted.

In step 410, the computer system receives, from network accessing applications of a plurality of electronic devices, IP trajectory information including a user identifier, a list of IP addresses, and timestamps. The network accessing applications may include a web browser such as Internet Explorer, Google Chrome, or Firefox, and mobile applications for iPhone, iPad, Android phone and tablet, etc. For example, as explained above with reference to FIG. 3, the computer system may receive, from a web browser of the laptop computer 220, IP trajectory information that includes BCookie of "55ob9mg4nj313" associated with the web browser, IP addresses of 99.21.68.40 and 174.62.115.188, and timestamps indicating when connections were made. Also, the computer system may receive, from a mobile application of the tablet computer 224, other IP trajectory information that includes a unique user identifier of "4kga93k1634" associated with the tablet computer 224, IP addresses of 99.21.68.40 and 76.102.84.244, and timestamps.

In step 420, the computer system identifies commercial IP addresses among the list of IP addresses. The identification may be made in several ways. First, the computer system may identify commercial IP addresses and residential IP addresses based on the number of BCookies and unique user identifiers that are reported for a certain IP address. For example, if many people access the network using their own devices at a certain coffee shop through the same router of the coffee shop, many BCookies and unique user identifiers associated with the devices would be reported for the IP address of the router at the coffee shop. In contrast, a router at home may be connected with only a few devices of household members, and thus, only a few BCookies or unique user identifiers of the devices would be reported for the IP address of the router at home. Thus, if the number of BCookies and unique user identifiers that are reported for a certain IP address is more than a threshold number, e.g., 10 or 20, then that IP address is more likely to be identified as a commercial IP address.

Second, the computer system may identify commercial IP addresses and residential IP addresses based on the time of connection activities. The time of connection may be determined from timestamp data included in an IP trajectory. For example, if BCookies are reported for a certain IP address mostly at daytime on weekdays, the certain IP address is likely to be identified as a commercial IP address because people usually go outside during daytime on weekdays. In contrast, if BCookies are reported for a certain IP address frequently at late night on weekdays, or in the morning on the weekend, that IP address is likely to be identified as a residential IP address because people usually access the Internet at home late at night or in the morning on weekend.

Third, the computer system may identify commercial IP addresses and residential IP addresses based on the repeated connection activities. For example, if a BCookie is reported for a certain IP address constantly throughout one month, e.g., every day for one month, the IP address is more likely to be a residential IP address because people connect with the Internet at home every day. To the contrary, if a BCookie is reported for a certain IP address only a few times at random days, that IP address is more likely to be a commercial IP address.

Fourth, the computer system may identify commercial IP addresses and residential IP addresses based on metadata about IP addresses. The metadata may be provided by an IP intelligence company. For example, the metadata includes a commercial IP datapack. The commercial IP datapack annotates IP addresses to different classes, such as mobile/ wireless, satellite, and broadband. Specifically, mobile/wireless classes may correspond to, for example, an AT&T or Verizon Cellular gateway. Satellite class may correspond to IP addresses that show the communication through a satellite communication network. Broadband class may represent IP addresses registered or owned by some companies. The computer system may identify these classes of IP addresses as commercial IP addresses. Thus, by analyzing the data of the IP trajectories, determining and applying certain rules and conclusions based on experience and observation, commercial IP addresses may be identified among the collected list of IP addresses.

In step 430, the computer system removes commercial IP addresses from the list of IP addresses to produce revised IP trajectory information. With the removal of commercial IP addresses, IP trajectory information is transformed to information suitable for determining whether any two network accessing applications belong to the same group of people. For example, referring back to FIG. 3, commercial IP addresses of 76.102.84.244 and 174.62.115.188 are removed from the list of IP addresses to produce revised IP trajectory information.

When commercial IP addresses are removed from the list of IP addresses, BCookies and timestamps associated with those commercial IP addresses may also be removed from the IP trajectory information. Thus, overall processing time is shortened because less information is processed in identifying any two network accessing applications that belong to the same group of people.

In step 440, the computer system analyzes the revised IP trajectory information to retrieve a most commonly used IP address for each of network accessing applications of the plurality of electronic devices. For example, as illustrated in FIG. 3, the IP trajectory information for the smartphone 226 has four IP addresses: 99.21.68.40, 76.102.84.244, 174.62.115.188, and 35.63.66.143. The revised IP trajectory information only includes residential IP addresses: 99.21.68.40 and 35.63.66.143. Out of the two residential IP addresses, the IP address of 99.21.68.40 is the most commonly used IP addresses as shown in FIG. 3. Also, the IP trajectory information of the desktop computer 222 has only one IP address 99.21.68.40. That is, BCookie of 643kdhs93ngd9 n is reported exclusively for the IP address of 99.21.68.40. This exclusive IP address may be a reference IP address that may be used in the following step for comparing two IP addresses.

In step 450, the computer system determines that different network accessing applications belong to the same group if the most commonly used IP addresses for the different network accessing applications are the same. For example, as described in step 440, the IP address of 99.21.68.40 is a reference IP address because it is an exclusive IP address for BCookie of 643kdhs93ngd9. For the unique user identifier of 4kga93k1634, the most commonly used residential IP address is 99.21.68.40 which is the same as the reference IP address. Thus, the computer system may recognize that two network accessing applications, which are respectively associated with the unique user identifier of 4kga93k1634 and BCookie of 643kdhs93ngs9, belong to the same person or at least to the same household. In this way, the computer system may group BCookies of 55on9mh4nj413 and 643kdhs93ngd9, and unique user identifiers of 4kga93k1634 and df41g3gh35 and mark them as belonging to the same person, household, or group. This information may be later utilized by a service provider or advertiser in targeting family members residing in the same house or members of a group that share common interests.

Alternatively, the computer system may determine that different network accessing applications belong to a single group. The group may include any selected group, such as co-workers, students, colleagues, or any group that has a defined connection such as a common network access point. If there is no exclusive IP address used for a certain network accessing application, any two most commonly used IP addresses are compared to find two network accessing applications belonging to the same household or same group of people.

In addition to identifying different network accessing applications belonging to the same household, the server may identify a network accessing application most frequently used by a person or household members based on the size of circles (as illustrated in FIG. 3, for example) and the number of IP addresses for which BCookies or a unique user identifiers are reported. For example, among the four IP trajectories as illustrated in FIG. 3, the IP trajectory for the unique user identifier of df41g3gh35 includes the largest number (4) of IP addresses and circles of the largest average size. Thus, the computer system may determine that a network accessing application associated with the unique user identifier of df41g3gh35 is most frequently used by the same person, household or group identified in step 450. This information may be later used by an ad server to effectively deliver advertisements to the group. For example, the ad server may deliver advertisements to household members more often through the network connecting application associated with the unique user identifier of df41g3gh35 than other network connecting applications that belong to the same household.

Figure 5:
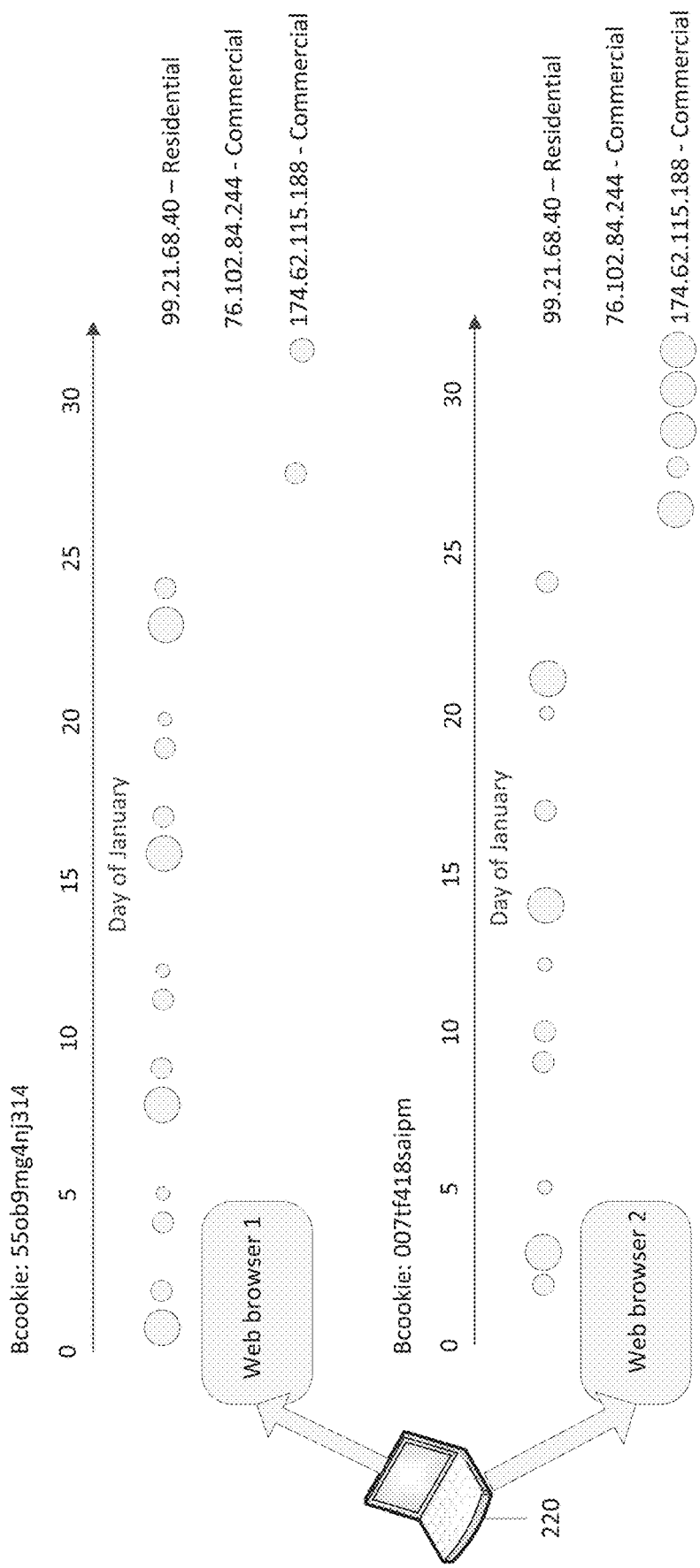
FIG. 5 illustrates IP trajectories for an example device using more than one web browsers.

FIG. 5 illustrates IP trajectories for an example device using more than one web browser. A single user may use several web browsers for a single device. For example, the user 230 may use Internet Explorer, Google Chrome, and Firefox web browsers for the laptop computer 220 when she accesses the Internet. Specifically, as illustrated in FIG. 5, the user 230 opens Web browser 1 and Web browser 2 to visit a certain website. The IP trajectory information for Web browser 1 includes BCookie of "55ob9mg4nj314" as a user identifier, and a list of IP addresses: 99.21.68.40 and 174.62.115.188. Also, the IP trajectory information for Web browser 2 includes BCookie of "007tf418saipm" and a list of IP addresses: 99.21.68.40 and 174.62.115.188. Even if the two web browsers are used by the same user, BCookies for each of the web browsers are different. Thus, because the server 202 receives two different BCookies, it would not be able to identify that Web browser 1 and Web browser 2 are originated from the same person or same household.

However, the method described with reference to FIG. 4 enables the server to identify two different network accessing applications that belong to the same person or household. For example, for the IP trajectory information for Web browser 1, the commercial IP address of 174.62.115.188 is identified and removed from the list of IP addresses. Similarly, for the IP trajectory information for Web browser 2, the commercial IP address of 174.62.115.188 is identified and removed from the list of IP addresses. The identification of a commercial IP address is described in detail above in conjunction with step 420 of FIG. 4. Then, for both Web browser 1 and Web browser 2, the most commonly used residential IP address is 99.21.68.40. Thus, the server 202 may identify that Web browser 1 and Web browser 2 belong to the same person or at least the same household.

Figure 6:
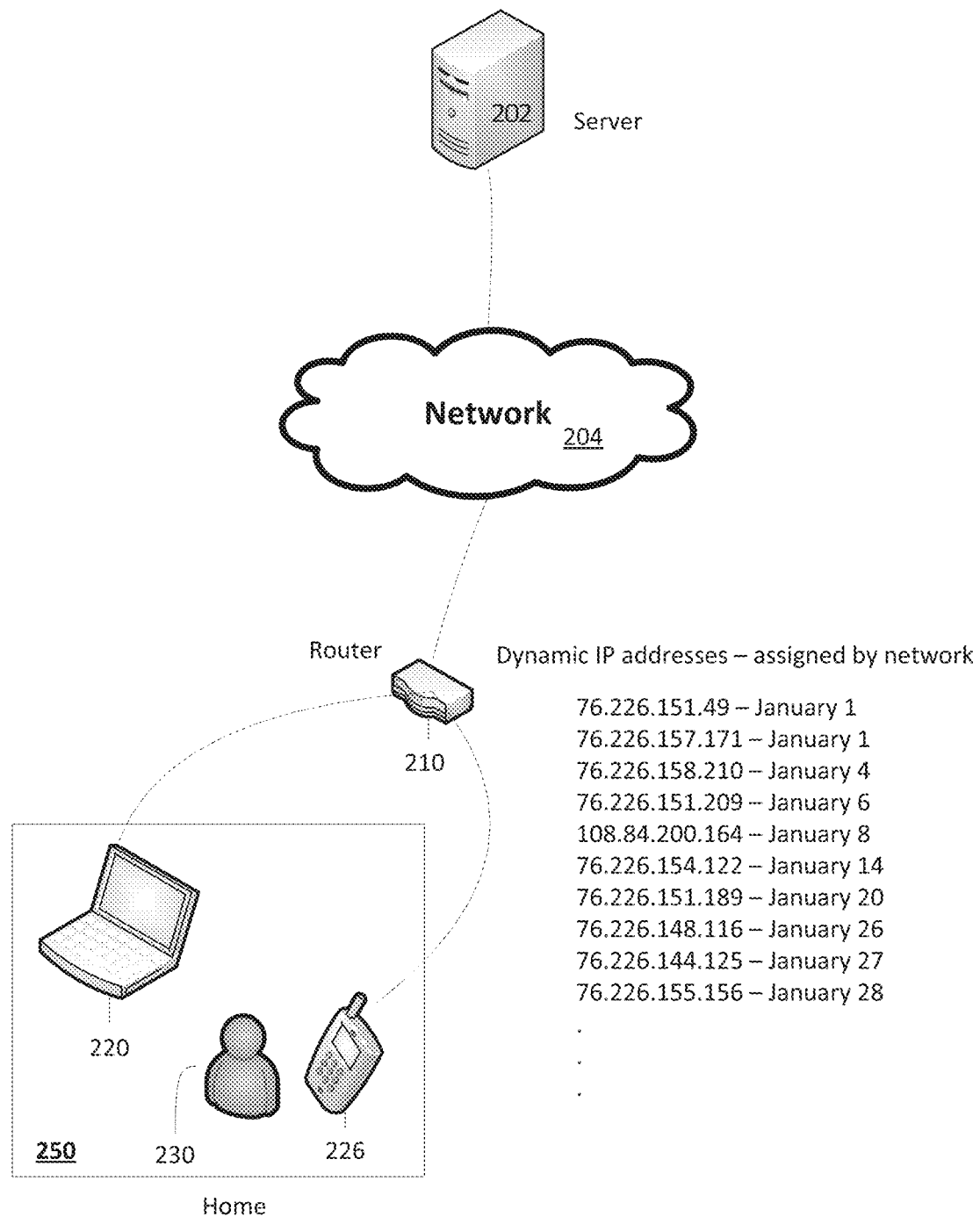
FIG. 6 illustrates multiple electronic devices accessing a network via a router that is assigned dynamic IP addresses.

FIG. 6 illustrates multiple electronic devices accessing network 204 via a router 210 that is assigned dynamic IP addresses. When a router is assigned a static IP address, its assigned IP address does not change. The router always has the same IP address. However, many routers use dynamic IP addresses, which are assigned by a network when they connect to the network. Dynamic IP addresses change frequently as opposed to static IP addresses. Dynamic IP addresses are used because they avoid the administrative burden of assigning specific static addresses to each device on a network. They also allow many devices to share limited address space on a network if only some of them will be online at a particular time.

As illustrated in FIG. 6, a dynamic IP address is assigned to the router 210 with which devices at home 250 are connected. For example, the router 210 was assigned an IP address of 76.226.151.49 before January 1, and assigned a new IP address of 76.226.157.171 on January 1. Then, another IP address of 76.226.158.210 is assigned to the router 210 on January 4. The dynamic IP address assigned to the router 210 continues to change throughout January as shown in FIG. 6. Thus, the server 202 would receive changing IP addresses from the laptop computer 220 or the smartphone 226 when those devices access the network 204 through the router 210. The changing IP addresses will be described more in detail below with reference to FIG. 7.

Figure 7:
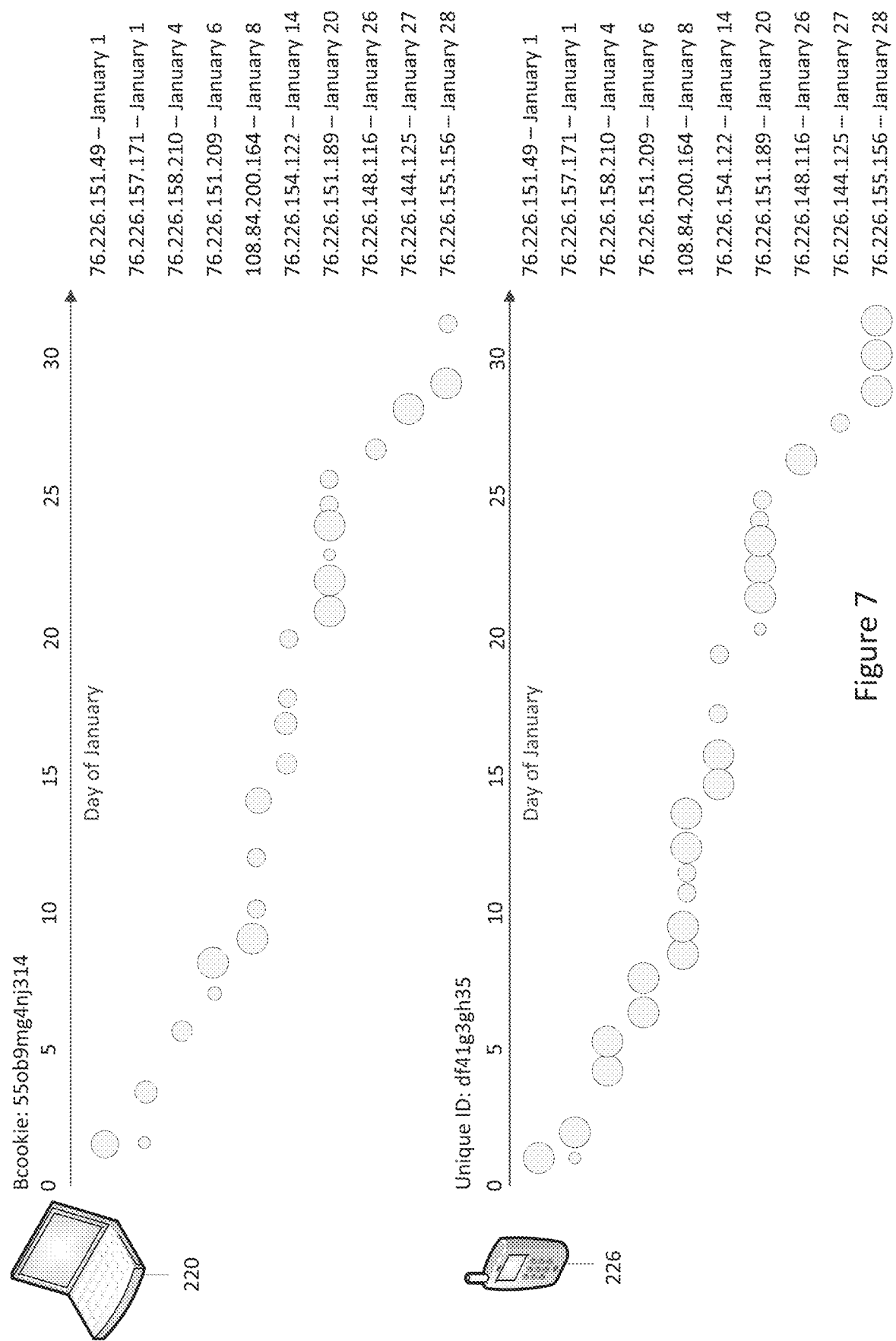
FIG. 7 illustrates an example of IP trajectories for multiple devices connecting to a router assigned dynamic IP addresses.

FIG. 7 illustrates an example of IP trajectories for multiple devices connecting to a router assigned dynamic IP addresses. As described with reference to FIG. 3, when a user visits a webpage using her device via a router, a server for the webpage receives IP trajectory information including a user identifier, a list of IP addresses, and timestamps. For example, IP trajectories of the laptop computer 220 and the smartphone 226 for a month of January are illustrated in FIG. 7. As described with reference to FIG. 6, the laptop computer 220 and the smartphone 226 may be used by the user 230 or other family member in the same household. Each of the IP trajectories includes a user identifier, a list of IP addresses and timestamps. For example, the IP trajectory of the laptop computer 220 includes a BCookie of "55ob9mg4nj314" as a user identifier, and a list of IP addresses: 76.226.151.49, 76.226.157.171, 76.226.158.210, 76.226.151.209, 108.84.200.164, 76.226.154.122, 76.226.151.189, 76.226.148.116, 76.226.144.125, 76.226.155.156. The long list of IP addresses is due to dynamic IP addresses assigned to the router 210 as shown in FIG. 6.

As opposed to the example described with reference to FIG. 3, it is difficult for the server 202 to find a most commonly used residential IP address because the dynamic IP address for the router 210 has been randomly changed. Even if the server 202 may find most commonly used IP addresses, e.g., 76.226.151.189 for IP trajectories of the laptop computer 220, and 108.84.200.164 for IP trajectories of the smartphone 226, the two commonly used IP addresses are different. Thus, the server would not be able to identify that the two IP trajectories originate from the same person or household.

Figure 8:
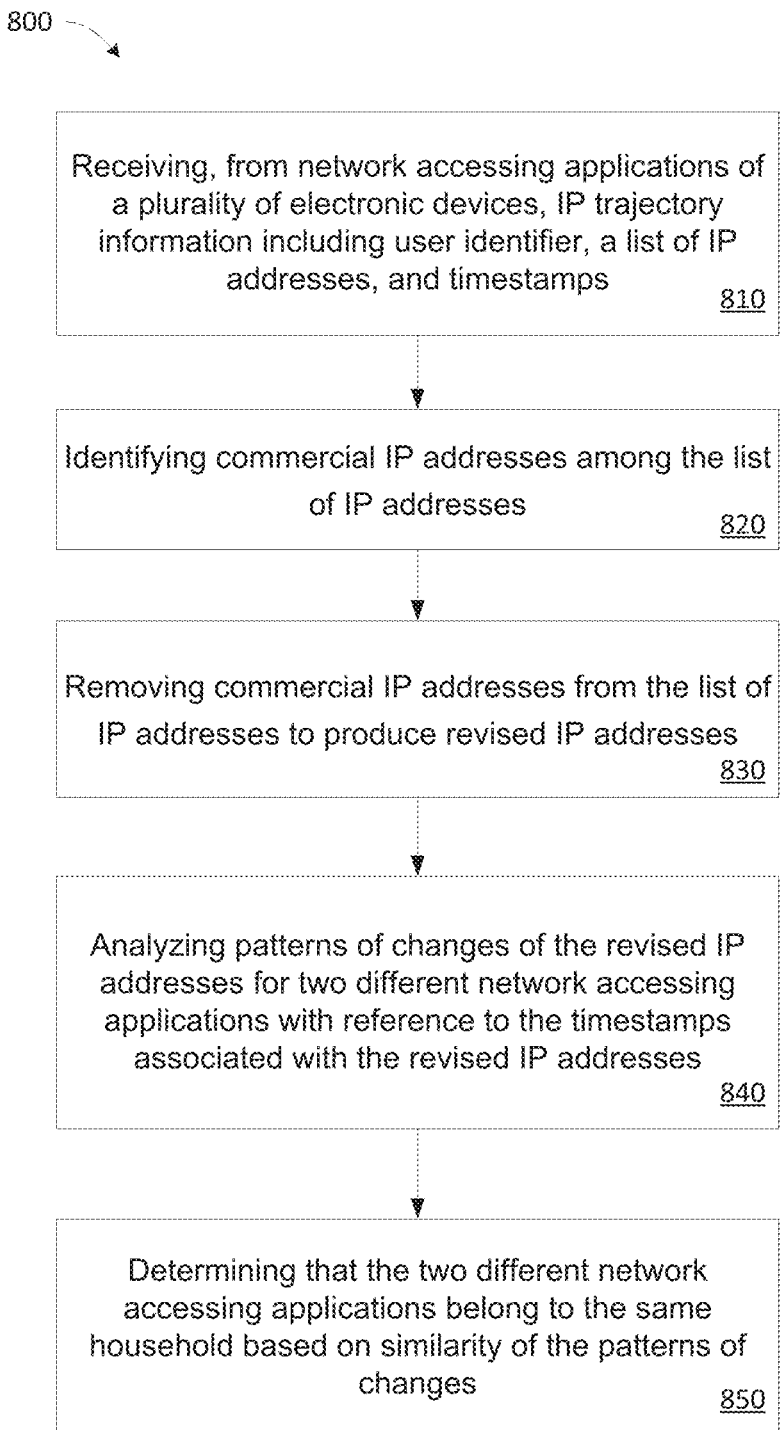
FIG. 8 is an example flow diagram illustrating embodiments of the disclosure.

FIG. 8 is an example flow diagram illustrating embodiments of the disclosure. The flow diagram 800 may include IP trajectory analysis implemented at least partially by a computer system that includes a server 202 having a processor or computer. The computer implemented method according to the example flow diagram 800 includes the following acts. Other acts may be added or substituted.

In step 810, the computer system receives, from network accessing applications of a plurality of electronic devices, IP trajectory information including a user identifier, a list of IP addresses, and timestamps. The network accessing applications may include a web browser such as Internet Explorer, Google Chrome, or Firefox, and mobile applications for iPhone, iPad, Android phone and tablet, etc. For example, as explained above with reference to FIG. 7, the computer system may receive IP trajectory information that includes BCookie of "55ob9mg4nj313", timestamps indicating when connections were made, and the list of IP addresses: 76.226.151.49, 76.226.157.171, 76.226.158.210, 76.226.151.209, 108.84.200.164, 76.226.154.122, 76.226.151.189, 76.226.148.116, 76.226.144.125, and 76.226.155.156.

In step 820, the computer system identifies commercial IP addresses and residential IP addresses from the list of IP addresses. The method of identifying commercial IP addresses is described above in detail in step 420 with reference to FIG. 4. Although the list of IP addresses shown in FIG. 7 only includes residential IP addresses, the list of IP addresses may also include commercial IP addresses which may be identified in step 820.

In step 830, the computer system removes commercial IP addresses from the list of IP addresses to produce revised IP addresses. With the removal of commercial IP addresses, IP trajectory information is transformed to information suitable for determining whether any two network accessing applications belong to the same household.

In step 840, the computer system analyzes patterns of changes of the revised IP addresses for two different network accessing applications with reference to the timestamps associated with the remaining IP addresses. For example, as illustrated in FIG. 7, an IP address for which BCookie of 55ob9mg4n314 is reported changes to other IP address on January 1, 4, 6, 8, 14, 20, 26, 27 and 28. Similarly, an IP address for which a user unique identifier of df41g3gh35 is reported changes to other IP address on January 1, 4, 6, 8, 14, 20, 26, 27 and 28. The two change patterns correspond to each other, and thus, the computer system would be able to identify that both BCookie of 55ob9mg4n314 and the user unique identifier of df41g3gh35 come from the same router to which a dynamic IP address is assigned.

In step 850, the computer system determines that different network accessing applications belong to the same person or household based on similarity of the patterns of changes. For example, as described in step 840, the IP trajectories for BCookie of 55ob9mg4n314 have the same change patterns as those of the user unique identifier of df41g3gh35. Thus, the computer system would determine that both a web browser with which BCookie of 55ob9mg4n314 is associated and a mobile application with which a user unique ID of df41g3gh35 is associated, are originated from the same source such as the same person or household. Alternatively, the computer system would determine that different network accessing applications belong to a single group. The group may include any selected group, such as co-workers, students, colleagues, or any group that has a defined connection such as a common network access point.

Figure 9:
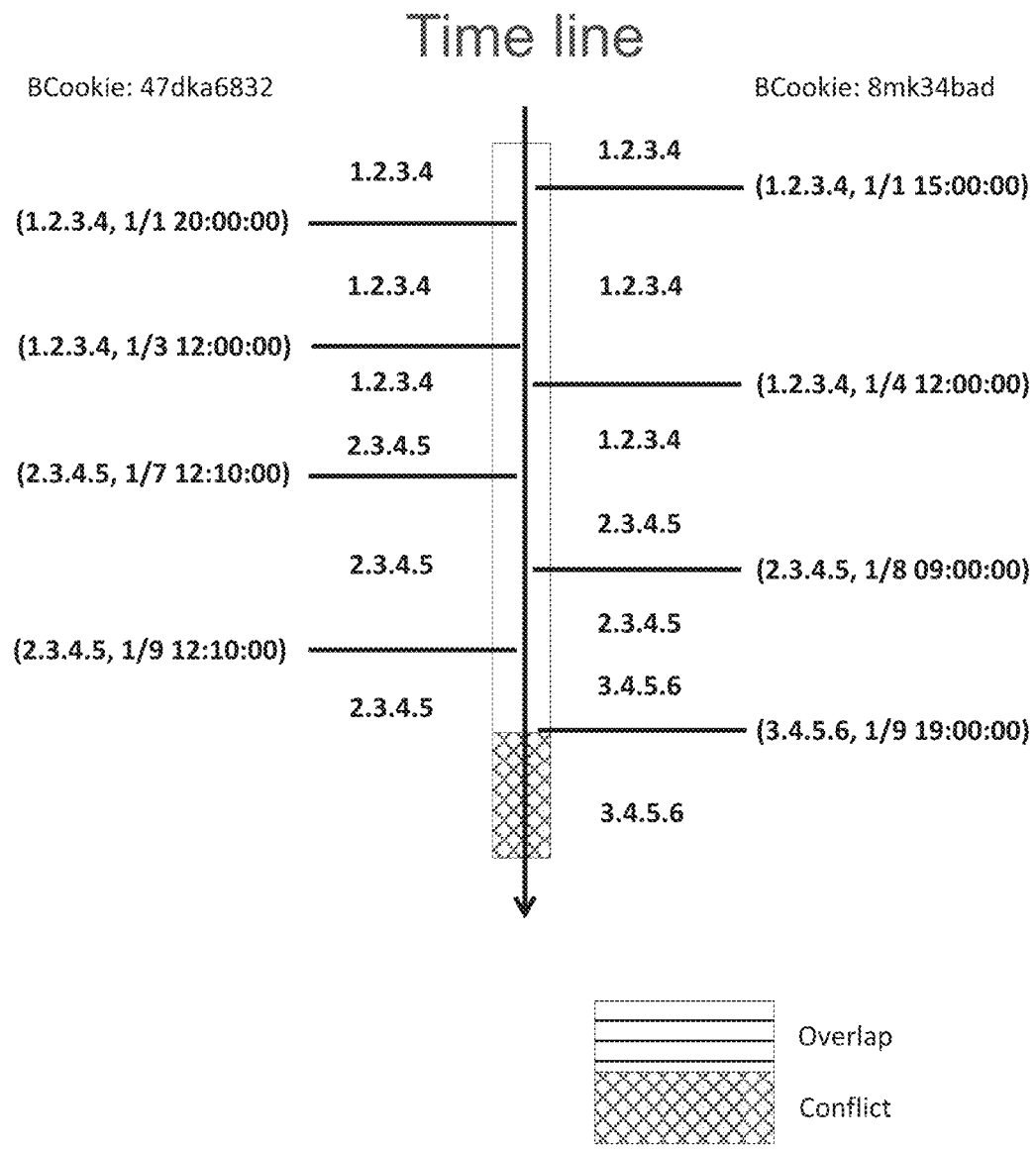
FIG. 9 illustrates an example graph comparing two IP trajectories.

FIG. 9 illustrates an example graph showing and comparing two IP trajectories. As described above, IP trajectory information includes a user identifier, a list of IP addresses, and timestamps. For example, the IP trajectory on the left side of FIG. 9 includes BCookie of 47dka6832 as a user identifier, IP addresses (1.2.3.4 and 2.3.4.5), and timestamps (1/1 20:00:00, 1/3 12:00:00, 1/7 12:10:00, and 1/9 12:10:00). Similarly, the IP trajectory on the right side of FIG. 9 includes BCookie of 8mk34bad as a user identifier, IP addresses (1.2.3.4, 2.3.4.5, and 3.4.5.6), and timestamps (1/1 15:00:00, 1/4 12:00:00, 1/8 09:00:00, and 1/9 19:00:00). In the notation used in this example, the parenthesis that includes both an IP address and a timestamp indicates a connection activity by a network accessing application at a certain time. For example, (1.2.3.4, 1/1 20:00:00) on the left side of FIG. 9 means that on January 1, 8 pm, a user opened a web browser associated with BCookie of 47dka6832 and accessed the network via a router to which an IP address of 1.2.3.4 is assigned. Similarly, (1.2.3.4, 1/1 15:00:00) on the right side of FIG. 9 means that on January 1, 3 pm, a user opened a web browser associated with BCookie of 8mk34bad and accessed the network via a router to which an IP address of 1.2.3.4 is assigned.

An IP address received during a time interval between two consecutive timestamps is estimated to be either an IP address at the first one of the two timestamps or an IP address at the second one of the two timestamps. For example, BCookie of 47dka6832 showed up on the IP address of 1.2.3.4 on January 3, 12 pm, and showed up on the IP address of 2.3.4.5 on January 7, 12:10 pm. An IP address during time between January 3, 12 pm and January 7, 12:10 pm is estimated to be either 1.2.3.4 or 2.3.4.5.

Based on the above IP address estimations, the hours of overlap and conflict between two IP trajectories are calculated. Two IP trajectories overlap if two BCookies of the two IP trajectories appeared on a common IP address and conflict if the two BCookies appeared on different IP addresses. For example, between January 1, 3 pm and January 3, 12 pm, the two BCookies appear on a common IP address of 1.2.3.4. Thus, the two IP trajectories overlap for this period.

Between January 3, 12 pm and January 4, 12 pm, an IP address associated with BCookie of 47dka6832 is estimated to be either 1.2.3.4 or 2.3.4.5, and an IP address associated with BCookie of 8mk34bad is estimated to be 1.2.3.4. The two BCookies appeared on a common IP address of 1.2.3.4, and thus, the two IP trajectories overlap for this period also. The overlap continues until January 9, 7 pm. On January 9, 7 pm, a user opened a web browser associated with BCookie of 8mk34bad and accessed the network via a router to which an IP address of 3.4.5.6 is assigned. For a time period starting with January 9, 7 pm, the two BCookies appeared on different IP addresses, and thus, the two IP trajectories conflict for this period. Although FIG. 9 illustrates IP trajectories for less than 15 days, the calculation of hours of overlap and conflict may be done for one month or longer.

Based on the calculation of the total hours of overlap versus conflict during a certain period of time, e.g., for 10 days, 15 days or 30 days, the patterns of the two IP trajectories are determined to be aligned or out of phase. For example, as shown in FIG. 9, the hours of overlap are much longer than the hours of conflict for the certain period of time. Thus, the patterns of the two IP trajectories are determined to be aligned. Because the two IP trajectories are aligned, the computer system may identify that the two IP trajectories are from the same router to which a dynamic IP address is assigned. Accordingly, the computer system may be able to identify the two IP trajectories belonging to the same person or the same group of people such as household members who connect with the network through a single router.

The threshold value for the ratio of overlap to conflict may be between 7:3 and 8:2 in determining whether two IP trajectories are aligned or not. For example, if two BCookies overlap for more than 574 hours (about 23.91 days) in one month, the two BCookies overlap for more than 70% of the one month, and thus, the two IP trajectories would be considered to be aligned. With the threshold value, the computer system may accurately identify any two network accessing applications that belong to the same household. For example, the computer system may identify any two network accessing applications that belong to the same household with over 90% accuracy.

Figure 10:
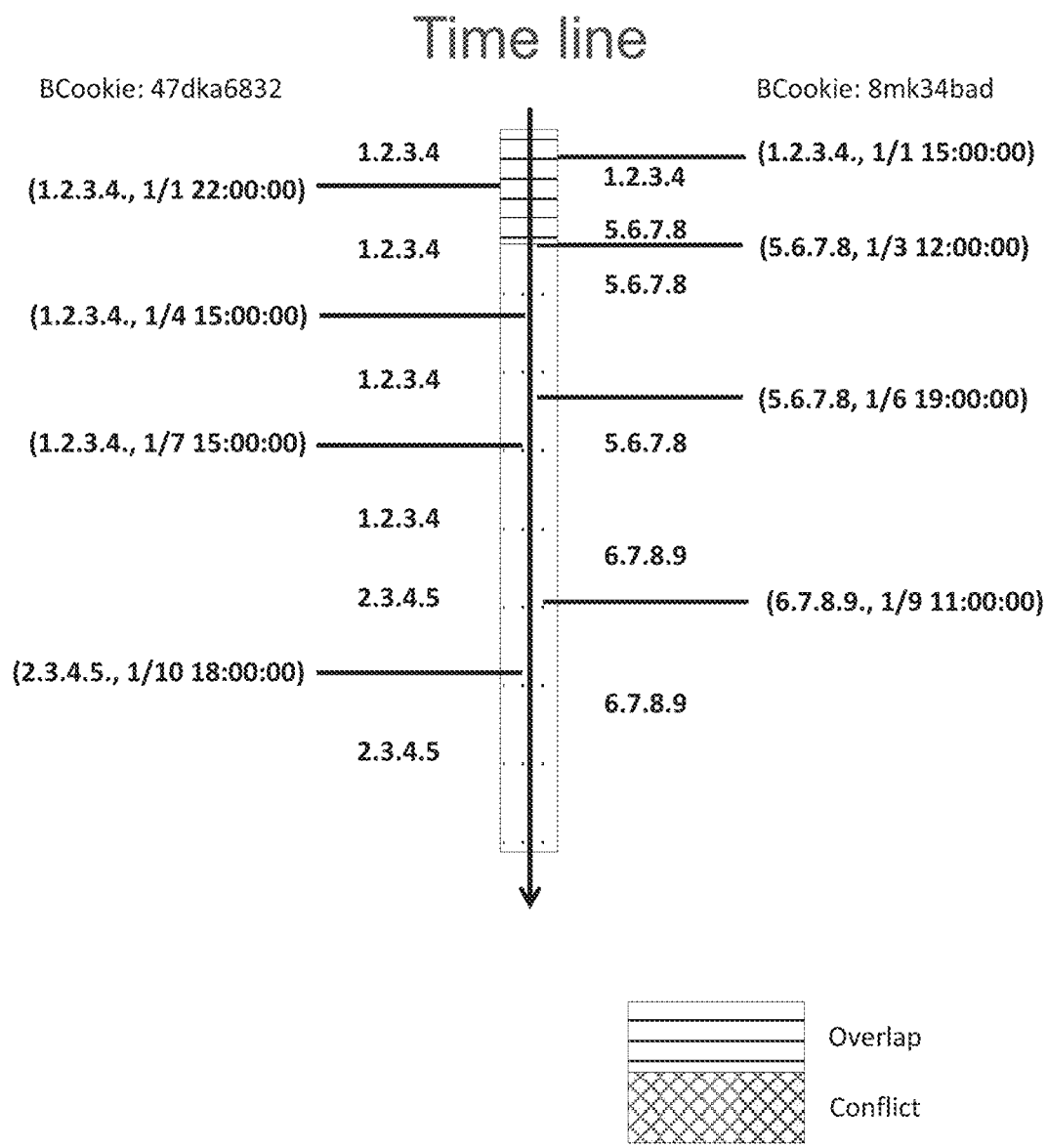
FIG. 10 illustrates other example graph comparing two IP trajectories.

FIG. 10 illustrates another example graph comparing patterns of changes of two IP trajectories. For example, the IP trajectory on the left side of FIG. 10 includes BCookie of 47dka6832 as a user identifier, IP addresses (1.2.3.4 and 2.3.4.5), and timestamps (1/1 22:00:00, 1/4 15:00:00, 1/7 15:00:00, and 1/10 18:00:00). Similarly the IP trajectory on the right side of FIG. 10 includes BCookie of 8mk34bad as a user identifier, IP addresses (1.2.3.4, 5.6.7.8, and 6.7.8.9), and timestamps (1/1 15:00:00, 1/3 12:00:00, 1/6 19:00:00, and 1/9 11:00:00).

As described above with reference to FIG. 9, based on the IP address estimation, the hours of overlap and conflict between two IP trajectories are calculated. From the beginning of January through January 3, 12 pm, the two IP trajectories overlap. In contrast, for the rest of January, the two IP trajectories conflict because the two BCookies do not appear on a common IP address. In this example, the hours of conflict are much longer than the hours of overlap. That is, the hours of conflict are less than 70% of the whole period of time described in FIG. 10. Thus, the patterns of the two IP trajectories are determined to be out of phase. Because the two IP trajectories are out of phase, the computer system may not find that the two IP trajectories originate from the same group.

Based on the identification of multiple network accessing applications belonging to the same person, household or a certain group, an ad server is able to better tailor the data and other information it provides to the members of the group. For example, the server may develop and use targeting rules based on the identities and activities of the respective members of the group. In one example the server may even provide the same advertisements to all the household members or all members in a certain group. Alternatively, an ad server is able to deliver the same advertisements to a single person through multiple electronic devices she owns. For example, an ad server may deliver and display an advertisement or complementary advertisements of a luxury sedan not only on the screen of a user's laptop computer but also on the screen of her smartphone. This advertising technique is much more effective than conventional advertising because a person is exposed to the same advertisement or complementary, reinforcing advertisements throughout her multiple devices. Also, it is effective because people in the same household or a certain group share their interests in purchasing products. Advertising across the household members having similar interests promotes them to discuss more about a targeted product and encourages them to buy the advertised products. The proposed methods described herein can significantly improve advertisement campaign performance in terms of both delivery and effectiveness, increase advertiser satisfaction, and hence boost revenue. Moreover, the proposed methods allow the server system to process data it has received and stored and, based on conclusions drawn from processing the data, provide to the members of the group data and other information which is more precisely tailored to their needs, both as individuals and as a group.

In addition, the present invention may recognize conversions between multiple electronic devices that belong to the same people or household. The present invention may also recognize purchases occurring across devices and family members. For example, according to the present invention, the computer system may determine that two BCookies and two unique user identifiers described in FIG. 3 belong to the same person or household, and recognize conversion patterns among the devices by analyzing four IP trajectories. Conversion patterns are valuable information for marketing and advertisement in online business.

Furthermore, with the help of the identification of multiple network accessing applications that belong to the same person or household, the computer system may build group profiles or house profiles which represent the purchase intents or content consumption interests of family members, and use the profiles for behavioral targeting. That is, the present invention enables a server to collect, for example, information on online purchases, the extent of exposure to advertisements, the number of visits to a certain website, etc. per household. For example, one may measure the advertising effectiveness at the house level and examine the advertisement influences on family members in a household by monitoring online activities of network accessing applications that belong to the same household.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

What is claimed is:

1. A method for identifying multiple electronic devices belonging to a same group, the method comprising:
   receiving, from network accessing applications of a plurality of electronic devices, internet protocol (IP) trajectory information about the network accessing applications via a network, the IP trajectory information including:
      a user identifier;
      IP address information including one or more dynamically assigned IP addresses associated with two or more respective network accessing applications of the network accessing applications; and
      timestamp information specifying times each of the network accessing applications accesses the network;
   identifying commercial IP addresses from the IP address information based on repeated connection activities, associated with a same electronic device, determined from the IP address information, wherein the identifying comprises determining that a first IP address included in the IP address information is likely a commercial IP address based on a determination that the same electronic device accessed the first IP address a threshold amount;
   removing the commercial IP addresses from the IP address information to produce revised IP trajectory information; and
   determining that different network accessing applications belong to the same group based on the timestamp information of the revised IP trajectory information.

2. The method of claim 1 wherein at least some of the one or more dynamically assigned IP addresses comprise addresses assigned by a particular network.

3. The method of claim 2 comprising:
   identifying common patterns of changes in the IP trajectory information based on the timestamp information of the revised IP trajectory information due to dynamic IP address assignment when at least two respective network accessing applications access the network; and
   determining that the different network accessing applications belong to the same group based on the common patterns of changes in the IP trajectory information.

4. The method of claim 3 comprising:
   determining a time duration of overlap for the revised IP trajectory information for a plurality of network accessing applications during a certain period of time;
   determining a time duration of conflict for the revised IP trajectory information for the plurality of network accessing applications during the certain period of time; and
   identifying the common patterns of changes in the IP trajectory information based on the time duration of overlap and the time duration of conflict.

5. The method of claim 1, wherein the network accessing applications comprise a web browser or a mobile application.

6. The method of claim 1, wherein the user identifier comprises a browser cookie, or a unique user identifier for a mobile device of the plurality of electronic devices.

7. The method of claim 1, wherein the plurality of electronic devices comprises portable electronic devices.

8. The method of claim 1, wherein the same group comprises one or more members of a family or one or more members of a same household.

9. The method of claim 1, wherein receiving IP trajectory information comprises receiving at least some static IP addresses along with the one or more dynamically assigned IP addresses.

10. The method of claim 1 comprising providing one or more identical advertisements to members of the same group.

11. A method for providing same information over a network to multiple electronic devices belonging to a same group, the method comprising:
   receiving, from network accessing applications of a plurality of electronic devices, internet protocol (IP) trajectory information about the network accessing applications via the network, the IP trajectory information including:
      a list of IP addresses associated with each of the network accessing applications, at least some IP addresses of the list of IP addresses comprising dynamically assigned IP addresses assigned by a router for a particular network; and timestamps specifying times each of the network accessing applications accesses at least one network including the particular network;

identifying commercial IP addresses among the list of IP addresses based on repeated connection activities, associated with a same electronic device, determined from the IP trajectory information; and removing the commercial IP addresses from the list of IP addresses to produce revised IP trajectory information.

12. The method of claim 11 comprising identifying common patterns of changes in the IP trajectory information due to dynamic IP address assignment when respective network accessing applications access the network.

13. The method of claim 12 comprising determining that different network accessing applications belong to the same group based on the common patterns of changes in the IP trajectory information.

14. The method of claim 13 comprising providing the same information to the different network accessing applications belonging to the same group via the network.

15. The method of claim 12 wherein identifying common patterns of changes in the IP trajectory information comprises:

determining a degree of alignment between the IP trajectory information.

16. The method of claim 15 wherein determining a degree of alignment comprises:

determining an amount of conflict time that IP trajectory information for a first network accessing application conflicts with IP trajectory information for a second network accessing application; and based on an amount of overlap time relative to the amount of conflict time, determining the degree of alignment.

17. The method of claim 15 wherein determining a degree of alignment comprises:

determining an amount of overlap time that IP trajectory information for a first network accessing application overlaps IP trajectory information for a second network accessing application; and determining an amount of conflict time that the IP trajectory information for the first network accessing application conflicts with the IP trajectory information for the second network accessing application.

18. The method of claim 17 comprising:

determining a ratio of the amount of overlap time to the amount of conflict time;

comparing the ratio to a threshold; and if the ratio exceeds the threshold, determining that the first network accessing application and the second network accessing application belong to the same group.

19. A non-transitory machine-readable medium comprising instructions that, when executed by a processor, perform a method for identifying multiple electronic devices belonging to a same group, the method comprising:

receiving, from network accessing applications of a plurality of electronic devices, internet protocol (IP) trajectory information about the network accessing applications via a network;

identifying commercial IP addresses from the IP trajectory information based on repeated connection activities, associated with a same electronic device, determined from the IP trajectory information; and removing the commercial IP addresses from the IP trajectory information to produce revised IP trajectory information.

20. The non-transitory machine-readable medium of claim 19, comprising determining that different network accessing applications belong to the same group based on timestamp information of the revised IP trajectory information.

* * * * *